(12) United States Patent
Lonas et al.

(10) Patent No.: US 10,686,759 B2
(45) Date of Patent: Jun. 16, 2020

(54) NETWORK THREAT PREDICTION AND BLOCKING

(71) Applicant: Webroot Inc., Broomfield, CO (US)

(72) Inventors: Hal Lonas, Broomfield, CO (US);
David Dufour, Broomfield, CO (US);
Chip Witt, Broomfield, CO (US);
Patrick Kar Yin Chang, San Jose, CA (US)

(73) Assignee: Webroot, Inc., Broomfield, CO (US)

( * ) Notice: Subject to any disclaimer, the term of this patent is extended or adjusted under 35 U.S.C. 154(b) by 0 days.

(21) Appl. No.: 14/745,637

(22) Filed: Jun. 22, 2015

(65) Prior Publication Data

US 2015/0372976 A1    Dec. 24, 2015

Related U.S. Application Data

(60) Provisional application No. 62/015,436, filed on Jun. 22, 2014.

(51) Int. Cl.
*H04L 29/06* (2006.01)
*H04L 12/24* (2006.01)

(52) U.S. Cl.
CPC ......... *H04L 63/0227* (2013.01); *H04L 63/14* (2013.01); *H04L 63/1425* (2013.01); *H04L 63/1441* (2013.01); *H04L 41/069* (2013.01)

(58) Field of Classification Search
CPC .................................. H04L 41/00; G06F 9/30
See application file for complete search history.

(56) References Cited

U.S. PATENT DOCUMENTS

| | | | |
|---|---|---|---|
| 8,776,180 B2* | 7/2014 | Kumar | G06F 21/52 713/155 |
| 9,503,470 B2* | 11/2016 | Gertner | H04L 63/145 |
| 2003/0110392 A1 | 6/2003 | Aucsmith et al. | |
| 2012/0233698 A1* | 9/2012 | Watters | G06F 21/554 726/25 |
| 2013/0074143 A1 | 3/2013 | Bu et al. | |
| 2014/0143863 A1 | 5/2014 | Deb et al. | |

FOREIGN PATENT DOCUMENTS

WO        2012/164336 A1    12/2012

OTHER PUBLICATIONS

International Search Report and Written Opinion for International Application No. PCT/US2015/036973, dated Oct. 13, 2015, 15 pages.

* cited by examiner

Primary Examiner — Joseph P Hirl
Assistant Examiner — Leynna Truvan
(74) Attorney, Agent, or Firm — Sprinkle IP Law Group

(57) ABSTRACT

A firewall monitors network activity and stores information about that network activity in a network activity log. The network activity is analyzed to identify a potential threat. The potential threat is further analyzed to identify other potential threats that are related to the potential threat, and are likely to pose a future risk to a protected network. A block list is updated to include the potential threat and the other potential threats to protect the protected network from the potential threat and the other potential threats.

20 Claims, 9 Drawing Sheets

NETWORK THREAT PREDICTION AND BLOCKING

CROSS-REFERENCE TO RELATED APPLICATION

This application claims priority to U.S. Application No. 62/015,436, filed on Jun. 22, 2014, and titled NETWORK THREAT PREDICTION AND BLOCKING, the disclosure of which is hereby incorporated by reference in its entirety.

BACKGROUND

Online threats to a network have rapidly increased in number, and the sophistication of such threats is continually on the rise. Although efforts are made to identify and block known threats, the threats are not static. Rather, online threats move and change rapidly. As a result, techniques that rely on blocking known threats are quickly outdated and ineffective against the short-lived, targeted, stealth attacks that are the hallmark of today's cybercriminal organizations.

SUMMARY

In general terms, this disclosure is directed to predictive network threat determination and blocking In one possible configuration and by non-limiting example, a potentially threatening network event is identified. The network event is evaluated to identify other potentially threatening network events that are related to it. A description of the potentially threatening network event and the other potentially threatening network events are then added to a firewall's block list. The firewall uses the block list to block all of the potentially threatening network events. Various aspects are described in this disclosure, which include, but are not limited to, the following aspects.

One aspect is a method of predicting network threats, the method comprising: identifying a threat vector from network activity log data using one or more computing devices; determining one or more related threat vectors having at least one known relationship to the threat vector using the one or more computing devices; and providing data regarding the threat vector and the one or more related threat vectors to a firewall device using the one or more computing devices, so that the firewall can block network activity associated with the threat vector and the one or more related threat vectors.

Another aspect is a computing system comprising: at least one processing device; and at least one computer readable storage device storing data instructions that, when executed by the at least one processing device, cause the at least one processing device to: identify an online element associated with network activity; determine that the online element is associated with a malicious reputation; identify related online elements that are related to the identified online element and are also associated with a malicious reputation; and sending data describing the online element and the related online elements to a firewall so that the firewall can block network activity associated with the online element and the related online elements.

A further aspect is a method of predicting network threats, the method comprising: receiving at a computing device a request including an identifier associated with an online element; comparing the identifier of the online element with a reputation database, using the computing device, to determine that the online element has a malicious reputation; sending from the computing device a response indicating that the online element has a malicious reputation; receiving at the computing device a request for known relationships to the online element; searching a relationship database to identify one or more related online elements that also have a malicious reputation, using the computing device; and sending from the computing device one or more identifiers for the one or more related online elements that have a malicious reputation.

Yet another aspect is a method of predicting network threats, the method comprising: analyzing network activity to identify a potential threat; identifying other potential threats related to the potential threat; and providing an update to a block list to a firewall device to permit the firewall device to add the potential threat and the other potential threats to the block list to protect a protected network from the potential threat and the other potential threats.

DETAILED DESCRIPTION

Figure 1:
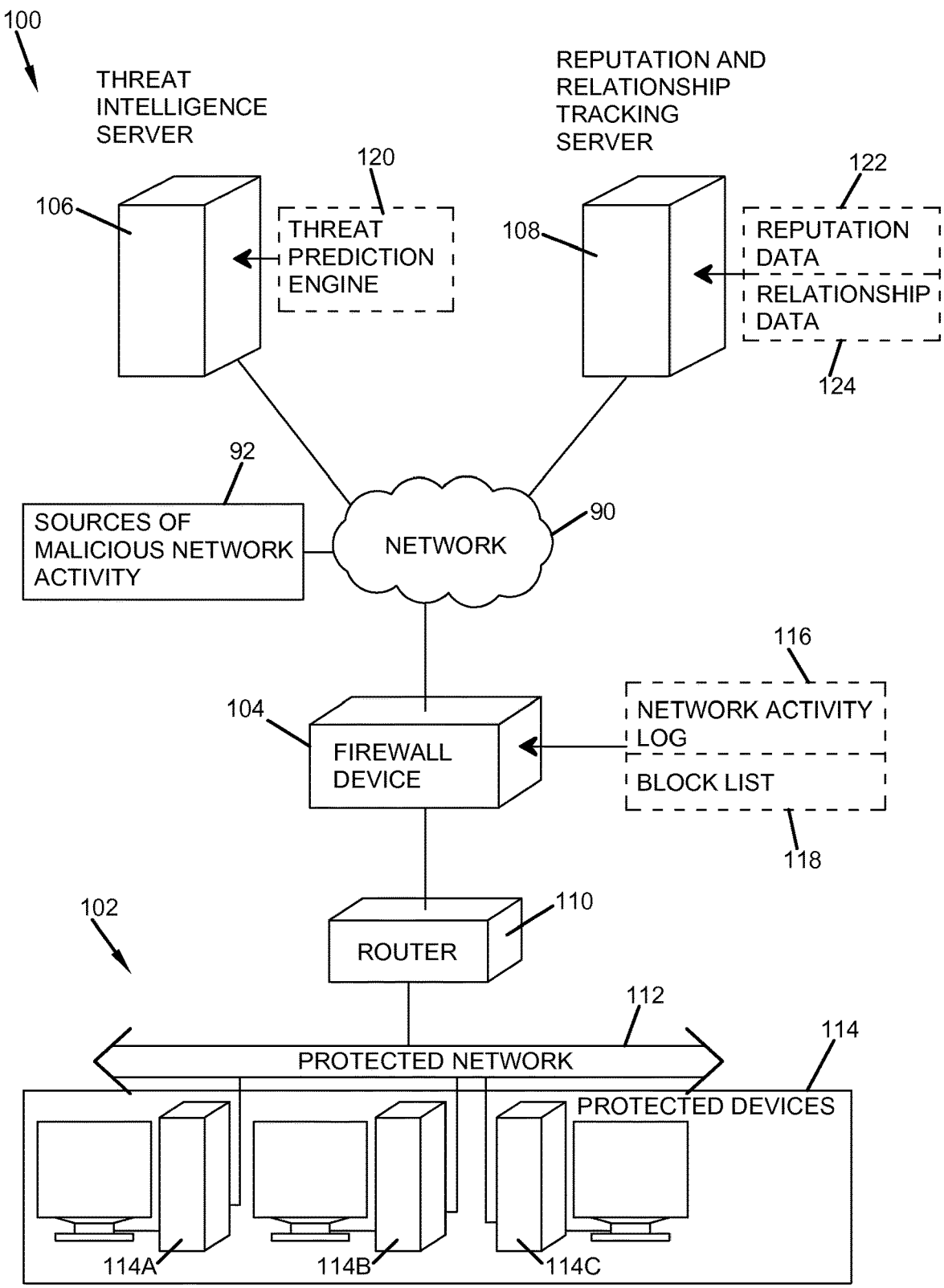
FIG. 1 is a schematic diagram illustrating an example of a network threat prediction and blocking system 100.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic diagram illustrating an example of a network threat prediction and blocking system 100. In this example, the system 100 includes a protected network 102, a firewall device 104, a threat intelligence server 106, and a reputation and relationship server 108. The example protected network 102 includes a router 110, a protected network communication system 112, and protected devices 114 (e.g., computing devices 114A-C). The example firewall device 104 includes a network activity log 116, and a block list 118. The example threat intelligence server 106 includes a threat prediction engine 120. The example reputation and relationship tracking server includes reputation data 122 and relationship data 124. Also shown are the communication network 90 and sources of malicious network activity 92.

The network threat prediction and blocking system 100 operates to protect a protected network 102 from sources of malicious network activity 92 encountered through the connection with the network 90.

An example of the network 90 is the public Internet. The sources of malicious network activity 92 are typically other computing devices that are also in data communication with the network 90.

The sources of malicious network activity 92 involve threat vectors to which the protected network 102 would be exposed if not for the network threat prediction and blocking system 100. Examples of threat vectors include malicious attacks originating from Internet Protocol (IP) addresses, files, software applications (including computer applications and mobile apps), and uniform resource locators (URLs).

The firewall device 104 is a network security system that monitors network activity coming in to and going out from the protected network 102, which operates to block the threat vectors of the sources of malicious network activity 92. In some embodiments the firewall device 104 generates a network activity log 116 documenting the network activity. The firewall device 104 utilizes a block list 118 to identify network activity that should be blocked to protect the protected network 102. Examples of the firewall device 104 are illustrated and described in further detail with reference to FIGS. 3-4.

The threat intelligence server 106 is a computing device that interacts with the firewall device 104 and provides a threat intelligence service. In some embodiments the threat intelligence server 106 includes a threat prediction engine 120 that operates to predict future sources of malicious activity 92 that may attempt to attack the protected network 102 and inform the firewall device 104 of the predicted sources of malicious activity 92 to permit the firewall device 104 to block network activity associated with those sources 92. An example of the threat intelligence server 106 is illustrated and described in further detail with reference to FIG. 5.

The reputation and relationship tracking server 108 is a computing device that provides information regarding the reputation of online elements (e.g. IP addresses, files, software applications, and URLs) and relationships between online elements. For example, in some embodiments the reputation and relationship tracking server 108 stores reputation data 122 for the online elements, and classifies the online elements into malicious or non-malicious categories. Some embodiments store relationship data 124 that identifies known relationships between online elements. In some embodiments the reputation and relationship tracking server provides a service in which reputation and relationship data is sent in response to requests, such as received from the threat intelligence server 106. An example of the reputation and relationship tracking server 108 is illustrated and described in further detail with reference to FIGS. 6-7.

Although certain aspects of the system 100 are illustrated in FIG. 1 in a particular exemplary implementation, other embodiments can have other configurations. For example, two or more of the devices can be combined onto a single device, or one of the devices can be separated into two or more devices. For example, the firewall device 104 can be a stand-alone device or part of another computing device (e.g., a server computing device or one of the protected devices 114). Similarly, the servers 106 and 108 can be combined, or either or both of the servers can be implemented on any number of computing devices, including a server farm. Further, any one or more aspects of the system 100 can be implemented in the cloud, or on a local computing device. Other embodiments will have other possible configurations as well.

Figure 2:
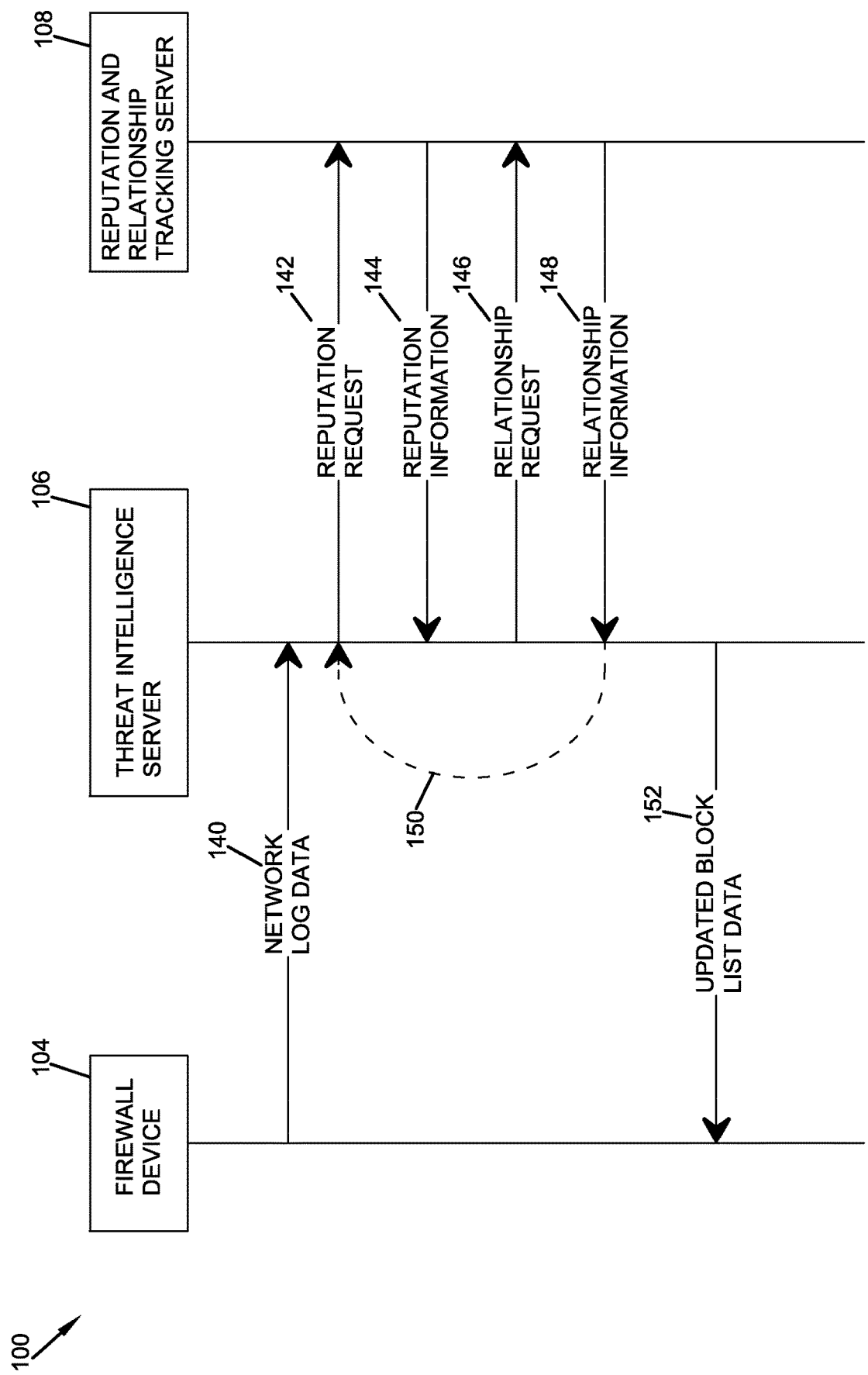
FIG. 2 is a communication diagram illustrating examples of various possible communications within the network threat prediction and blocking system shown in FIG. 1.

FIG. 2 is a communication diagram illustrating examples of various possible communications within the network threat prediction and blocking system 100. In this example, the system 100 includes communications 140, 142, 144, 146, 148, and 150.

The firewall device 104 collects data regarding network activity in a network activity log (116) and sends network log data 140 to the threat intelligence server 106.

The threat intelligence server 106 receives network log data 140 and processes the network activity identified therein. For example, the threat intelligence server 106 identifies a first network activity item and generates and sends a reputation request 142 to the reputation and relationship tracking server 108.

The reputation and relationship tracking server 108 receives the request 142, and searches through its reputation data 122 (FIG. 1) to determine if the online element associated with the network activity has a known reputation. If so, the reputation information 144 is sent back to the threat intelligence server 106. For example, in some embodiments the reputation information 144 identifies the online element associated with the network activity as malicious or non-malicious. In some embodiments if there is no known reputation, the reputation and relationship tracking server 108 conducts an investigation to evaluate the reputation of the online element, such as to classify the online element as malicious or non-malicious, and the reputation information 144 is then returned to the threat intelligence server 106.

The threat intelligence server 106 receives the reputation information 144, and determines whether the reputation information 144 identifies the online element as malicious. If so, the threat intelligence server 106 determines that the online element is a malicious online element, also referred to herein as a threat vector. For each threat vector identified by the threat intelligence server 106, it generates and sends the relationship request 146 to the reputation and relationship tracking server 108 to identify any related online elements.

The reputation and relationship tracking server 108 receives the relationship request 146 and searches through its relationship data 124 (FIG. 1) to determine if the threat vector has any known relationships with other online elements. If so, the reputation and relationship tracking server 108 generates and sends relationship information 148 identifying other online elements that are related to the threat vector.

The threat intelligence server 106 receives the relationship information 148. If relationships to other online elements have been identified, an operation 150 is performed to repeat the operations including messages 142, 144, 146, and 148 for the other online elements (including those associated with other network activity listed in the network log data 140, or other online elements related to a threat vector as identified by the reputation and relationship tracking server 108 discussed above). The operation 150 can be repeated as many times as desired. In some embodiments the process is limited to other online elements that are directly related to (e.g., one degree of separation from) the online element identified in the network activity. In other embodiments, the process is limited to those online elements that are two, three, or more degrees of separation from the online element identified in the network activity. Other limitations can be placed on the number of times that the operation 150 is performed in other embodiments.

The threat intelligence server 106 then processes this information from the reputation and relationship tracking server 108. More specifically, the threat intelligence server 106 stores information regarding any threat vectors that were identified directly from the network log data 140, and also information regarding any related threat vectors that were identified based on relationships to the threat vectors. The threat intelligence server 106 then generates updated block list data 152 for the threat vectors and sends the updated block list data 152 to the firewall device 104.

The firewall device 104 adds the updated block list data 152 to the block list 118 (FIG. 1), and operates to block network activity based on the block list 118. In this way the firewall device 104 can operate to block malicious network activity that has already been identified in the network activity log 116, as well as other potential threats that are predicted based on the known relationships with other network elements.

Figure 3:
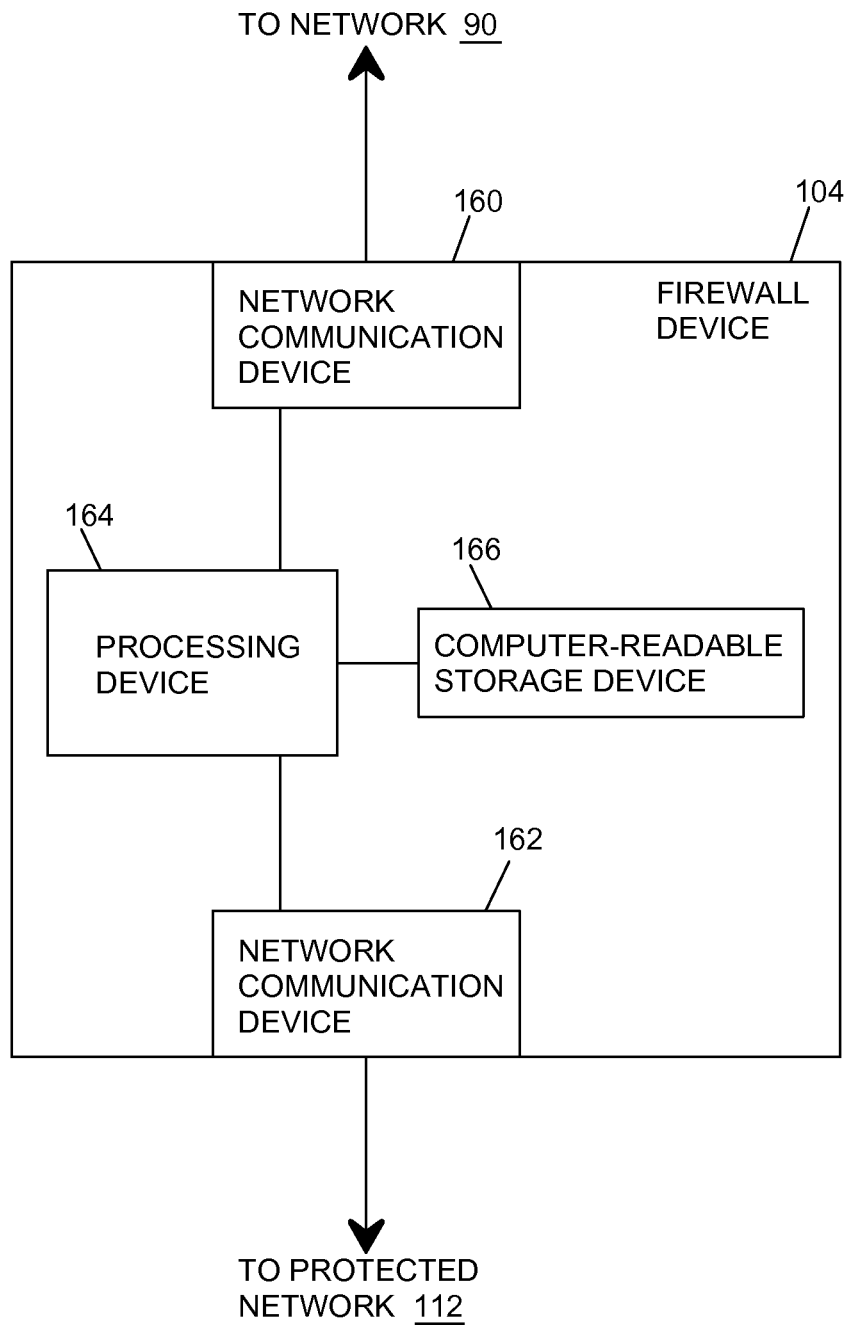
FIG. 3 is a schematic block diagram illustrating one example hardware configuration of a firewall device.

FIG. 3 is a schematic block diagram illustrating one example hardware configuration of the firewall device 104. In this example the firewall device 104 includes network communication devices 160 and 162, a processing device 164 (which can include one or more processing devices), and a computer-readable storage device 166 (which can include one or more computer-readable storage devices).

The network communication devices 160 and 162 operate to communicate digital data according to one or more data communication protocols. The network communication device 160 communicates with the network 90, and the network communication device 162 communicates with the protected network 102.

The firewall device 104 typically includes at least one processing device 164 and at least one computer-readable storage device 166. In some embodiments, the computer-readable storage device 166 stores data instructions that when executed by the processing device 164 causes the processing device to perform one or more of the operations, methods, processes, or steps described herein. For example, in some embodiments the processing device 164 implements one or more of the engines described with reference to FIG. 4.

As an example, the firewall device 104 can be one of the next-generation firewall appliances manufactured and distributed by Palo Alto Networks® of Santa Clara, Calif., such as any one of the PA-200, PA-500, PA-2000, PA-3000, PA-5000, and PA-7050 Series firewall appliances.

Figure 4:
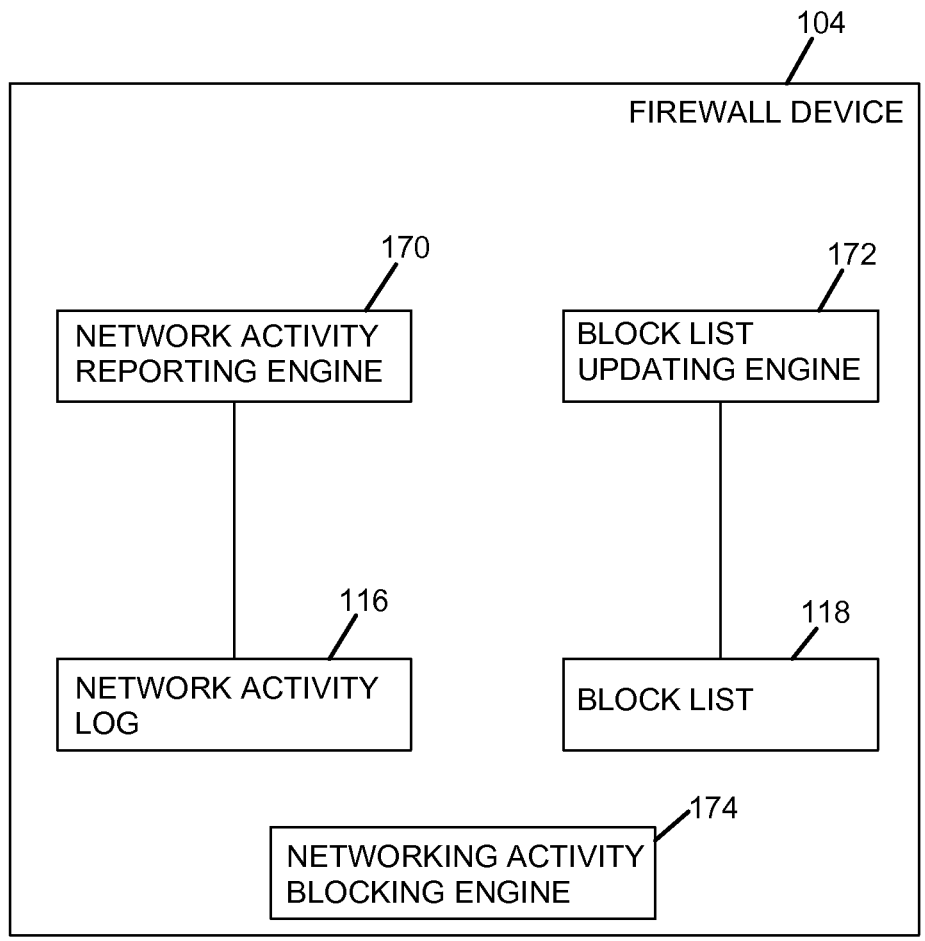
FIG. 4 is a functional block diagram illustrating several aspects of the example firewall device shown in FIG. 3.

FIG. 4 is a functional block diagram illustrating several aspects of an example of the firewall device 104. In this example, the firewall device 104 includes a network activity reporting engine 170, a block list updating engine 172, a network activity blocking engine 174, the network activity log 116, and the block list 118.

The network activity reporting engine 170 operates to retrieve data regarding network activity from the network activity log 116, and to generate and send network log data 140 (FIG. 2) to the threat intelligence server 106 (FIG. 1). In some embodiments the network activity reporting engine 170 operates to periodically check the network activity log 116 for network log data that has not yet been reported to the threat intelligence server 106. The period of time can be selected as duration of seconds, minutes, hours, or days, for example.

In some embodiments the firewall device 104 also includes a network activity log generator, not shown in FIG. 4, which operates to monitor network activity and store information regarding the network activity in the network activity log 116 as it occurs.

The block list updating engine 172 operates to receive updated block list data 152 (FIG. 2) from the firewall device 104, and to add the updated block list data 152 to the block list 118 of the firewall device 104.

The network activity blocking engine 174 operates to monitor network activity and to enforce a blocking policy on certain network activity based on the block list 118. For example, if an IP address is included on the block list, the network activity blocking engine 174 can operate to block network activity from, to, or both to and from the blocked IP address. The blocking policy can similarly be enforced against files, software applications, URLs or other network elements.

Figure 5:
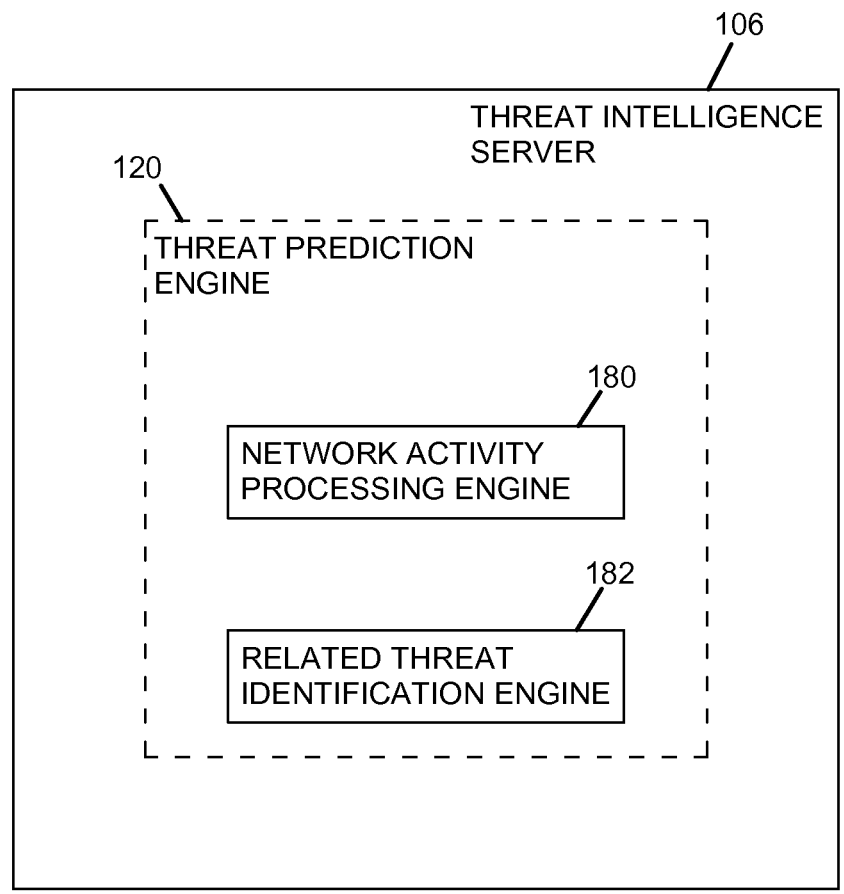
FIG. 5 is a schematic block diagram illustrating an example of a threat intelligence server.

FIG. 5 is a schematic block diagram illustrating an example of the threat intelligence server 106, shown in FIG. 1. In this example, the threat intelligence server 106 includes the threat prediction engine 120. In some embodiments the threat prediction engine 120 includes a network activity processing engine 180 and a related threat identification engine 182.

The network activity processing engine 180 operates to process network activity of the firewall device 104. For example, in some embodiments the network activity processing engine 180 receives the network log data 140 (FIG. 2) from the firewall device 104 and evaluates each of the network activity entries. For example, in some embodiments the network activity processing engine 180 identifies one or more online elements associated with each network activity, such as an IP address, a file, a software application, a URL, or another online element.

The network activity processing engine 180 then determines a known reputation for each network activity entry, or the one or more online elements associated therewith. For example, the network activity processing engine 180 sends a reputation request 142 (FIG. 2) to the reputation and relationship tracking server 108, and receives reputation information 144 in response that identifies the known reputation. In some embodiments the request 142 is an application programming interface (API) call. Any online elements that are known to be malicious are identified and stored as threat vectors by the network activity processing engine 180.

The related threat identification engine 182 operates to identify any other threat vectors that are related to the threat vector identified by the network activity processing engine 180. For example, the related threat identification engine 182 generates and sends a relationship request 146 to the reputation and relationship tracking server 108, and receives the relationship information 148 in response. In some embodiments the request 144 is an application programming interface (API) call. In some embodiments the related threat identification engine 182 identifies related online objects, and determines whether or not those online objects are malicious or non-malicious. Malicious online objects are stored as related threat vectors. The related threat identification engine 182 then stores information about the related threat vectors.

The threat prediction engine 120 then generates the updated block list data 152 including information about the threat vectors identified by the network activity processing engine, as well as the related threat vectors identified by the related threat identification engine 182. The updated block list data 152 is then sent to the firewall device 104 (FIG. 1).

Figure 6:
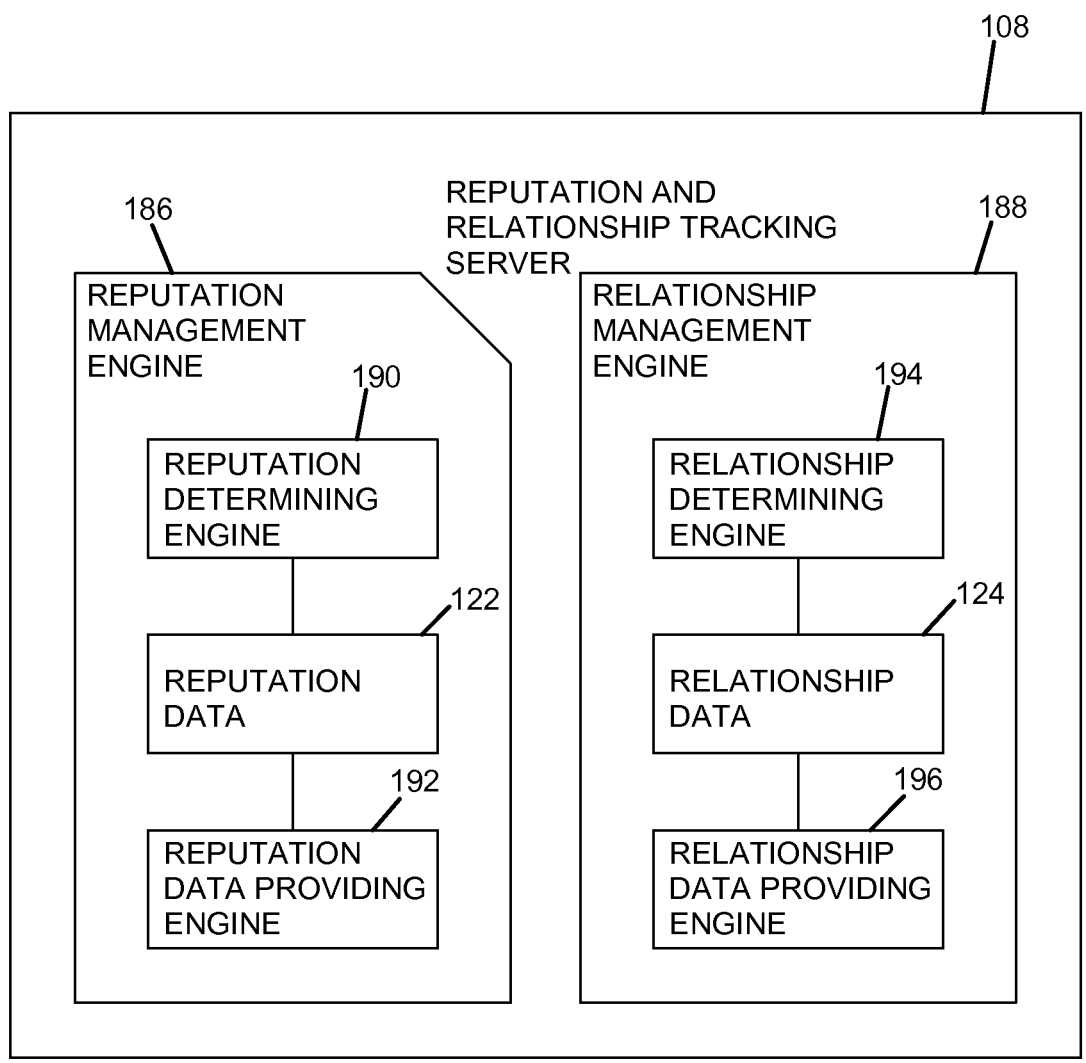
FIG. 6 is a schematic block diagram illustrating an example of a reputation and relationship tracking server.

FIG. 6 is a schematic block diagram illustrating an example of the reputation and relationship tracking server 108. In this example, the reputation and relationship tracking server 108 includes a reputation management engine 186 and a relationship management engine 188. In some embodiments the reputation management engine 186 includes a reputation determining engine 190, the reputation data 122, and a reputation data providing engine 192. In some embodiments the relationship management engine 188 includes a relationship determining engine 194, the relationship data 124, and a relationship data providing engine 196.

The reputation management engine 186 manages reputation data 122 documenting and describing reputations of online elements. One example of the reputation management engine 186 includes one or more of the Brightcloud® IP reputation service, file reputation service, mobile app reputation service, and web reputation service, each of which are available from Webroot Inc. of Broomfield, Colo.

The reputation determining engine 190 generates, stores, and maintains the reputation data 122. In some embodiments the reputation determining engine 190 is generated based on one or more of, a crawl of online elements such as web pages and contents of the web pages, scans of online elements on the network 90, data from global threat sensors, machine learning algorithms, human classification, the relationship data 124, or other information or knowledge. In some embodiments the reputation data 122 includes identifiers of online elements and determined reputations of those online elements (e.g., malicious or non-malicious). Some embodiments include additional reputation information for at least some of the online elements. One example of an identifier of an online element is the address of an IP address (e.g, 555.5.555.555). Another example of an identifier of an online element is a URL. Another example of an identifier of an online element is a hash of the online element, such as an MD5 hash value. The MD5 hash can be used to identify a file or a software application, for example. Such identifiers can be used throughout the system 100 to identify the online elements.

The reputation data providing engine 192 operates to provide reputation information 144 (FIG. 2) from the reputation data 122 in response to a request 142. In some embodiments the reputation data providing engine 192 provides an API interface through which requests 142 can be made and responses are sent. As one example, the reputation data providing engine 192 receives an API call requesting reputation information relating to an IP address found in the network activity log 116. The reputation data providing engine 192 performs a search of the reputation data 122 to find the IP address, retrieves the reputation information 144 from the reputation data 122, and sends the reputation information 144 to the requestor in response. In some embodiments the reputation information 144 identifies the online element as malicious or non-malicious (or, alternatively, as trustworthy). In some embodiments, when no reputation information 144 is found, the reputation data providing engine alerts the reputation determining engine 190, which adds the online element to a queue of online elements to be evaluated so that the reputation data 122 is populated for that online element.

The relationship management engine 188 manages relationship data 124 documenting and describing relationships between online elements. One example of the relationship management engine 188 is the Brightcloud® Security Services system, provided by Webroot Inc.

The relationship determining engine 194 generates, stores, and maintains the relationship data 124. In some embodiments the relationship determining engine 194 generates relationship data 124 based on one or more of a crawl of online elements such as web pages and contents of the web pages, scans of online elements on the network 90, data from global threat sensors, machine learning algorithms, human classification, the relationship data 124, or other information or knowledge. An example of the relationship data is shown in FIG. 7, and includes identifiers of the online elements and identifications of known relationships between the online elements.

The reputation data providing engine 196 operates to provide relationship information 148 (FIG. 2) from the relationship data 124 in response to a request 146. In some embodiments the relationship data providing engine 196 provides an API interface through which requests 146 can be made and responses sent. As one example, the relationship data providing engine 196 receives an API call requesting relationship information relating to an IP address (for example, IP address 202 shown in FIG. 7) found in the network activity log 116. The relationship data providing engine 196 performs a search of the relationship data 124 to find the IP address, retrieves relationship information 148 from the relationship data 124, and sends the relationship information 148 to the requestor in response. For example, referring to FIG. 7, in some embodiments the relationship data 124 includes one, two, or more levels of relationship data (describing those online elements that are within one, two, or more degrees of separation of the identified online element).

Figure 7:
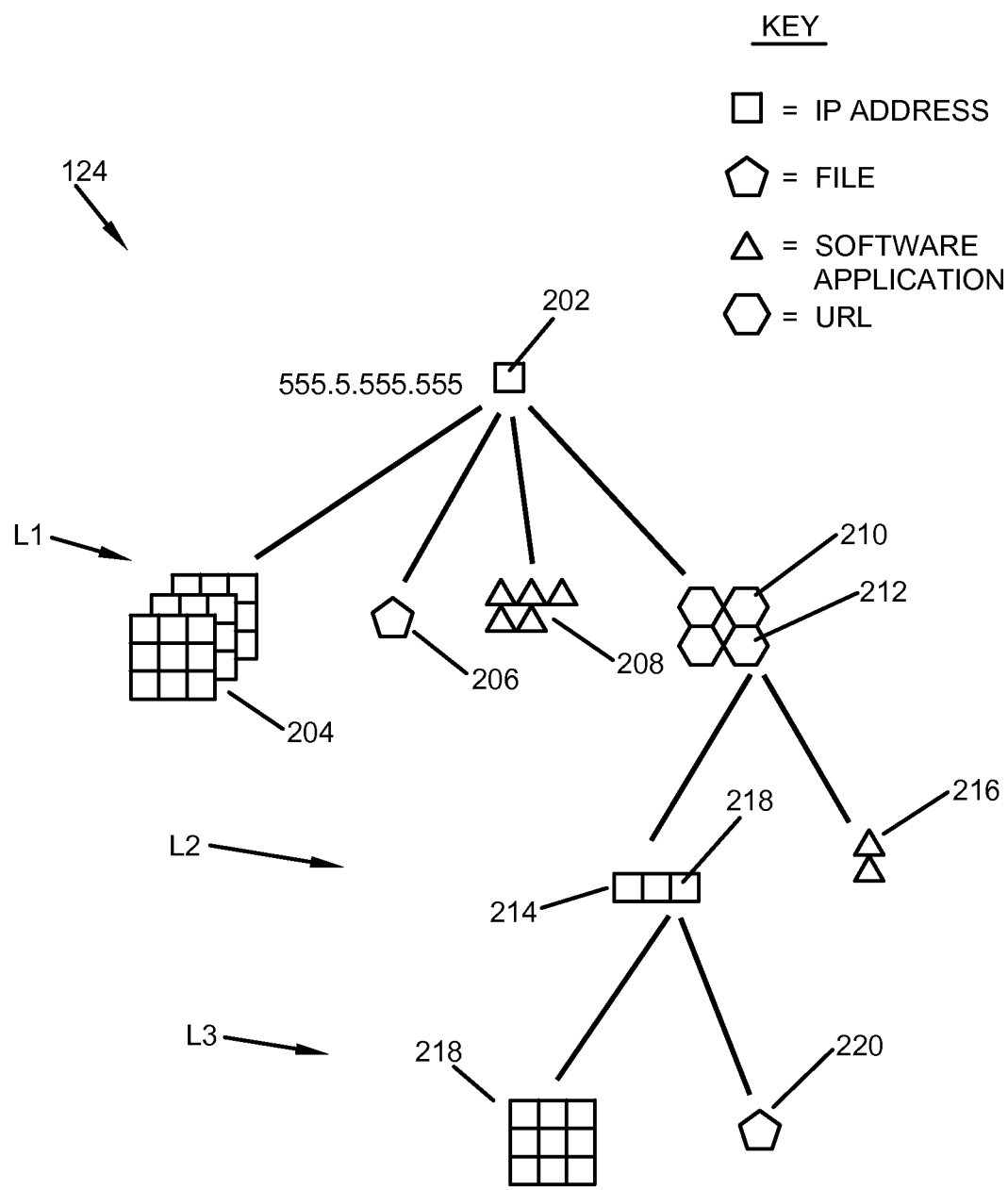
FIG. 7 graphically illustrates an example of a portion of relationship data of the reputation and relationship tracking server shown in FIG. 6.

FIG. 7 graphically illustrates an example of a portion of the relationship data 124 of the reputation and relationship tracking server 108. In this example, the relationship data associated with an online element, such as an IP address 202, is displayed. The relationship data 124 includes identifiers of the online objects (graphically represented by a square, pentagon, triangle, and hexagon) and the relationships between those objects (graphically represented by lines between the online objects). The relationship data 124 includes multiple levels of relationship data. In this example portions of three levels of relationship data are shown, including a first level L1, a second level L2, and a third level L3.

In this example, the online element 202 is directly related to a plurality of other online elements in the first level L1, including IP addresses 204, a file 206, software applications 208, and URLs 210 (including a particular URL 212).

One or more of the online elements in the first level L1 may also be related to other online elements. In this example, the relationships to the URL 212 are shown in the second level L2, which include IP addresses 214 (including a particular IP address 218) and two software applications 216. Other online elements in the first level L1 may also have related online elements, and such online elements are therefore also part of the second level L2.

One or more of the online elements in the second level may also be related to other online elements. In this example, the relationships to the IP address 218 are shown in the third level L3, which include IP addresses 218 and a URL 220. Other online elements in the second level L2 may also have related online elements, and such online elements are therefore also part of the third level L3. Additional levels can similarly be determined by identifying relationships with the online elements in the third level L3, or subsequent levels.

Figure 8:
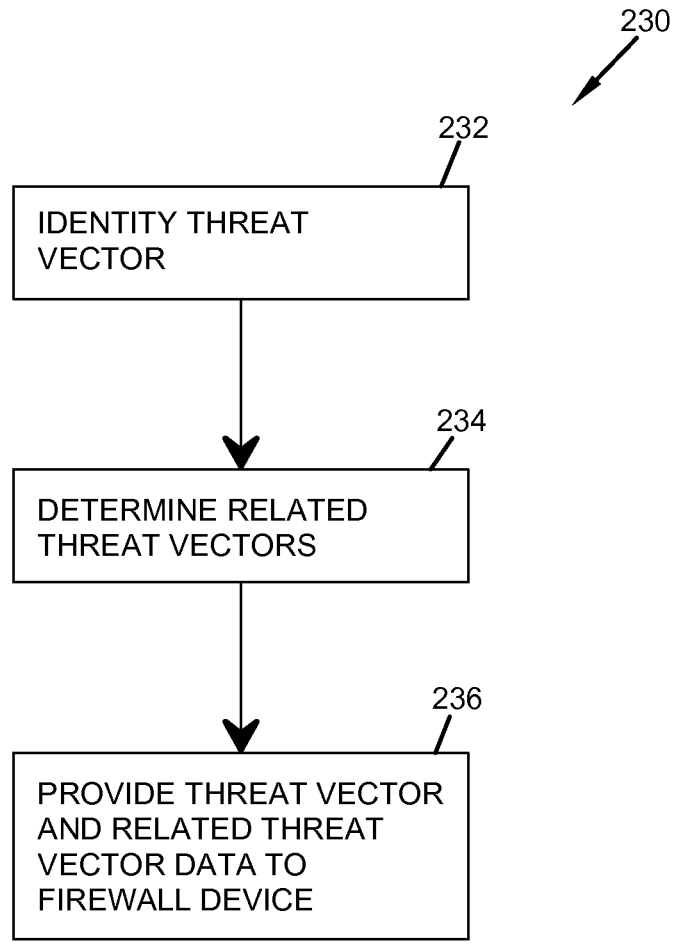
FIG. 8 is a flow chart illustrating a method of predicting network threats.

FIG. 8 is a flow chart illustrating a method of predicting network threats. In this example the method includes operations 232, 234, and 236.

The operation 232 is performed to identify a threat vector from network activity log data using one or more computing devices.

The operation 234 is performed to determine one or more related threat vectors having at least one known relationship to the threat vector using the one or more computing devices.

The operation 236 is performed to provide data regarding the threat vector and the related threat vectors to a firewall device using the one or more computing devices, so that the firewall can block network activity associated with the threat vector and the related threat vector.

Figure 9:
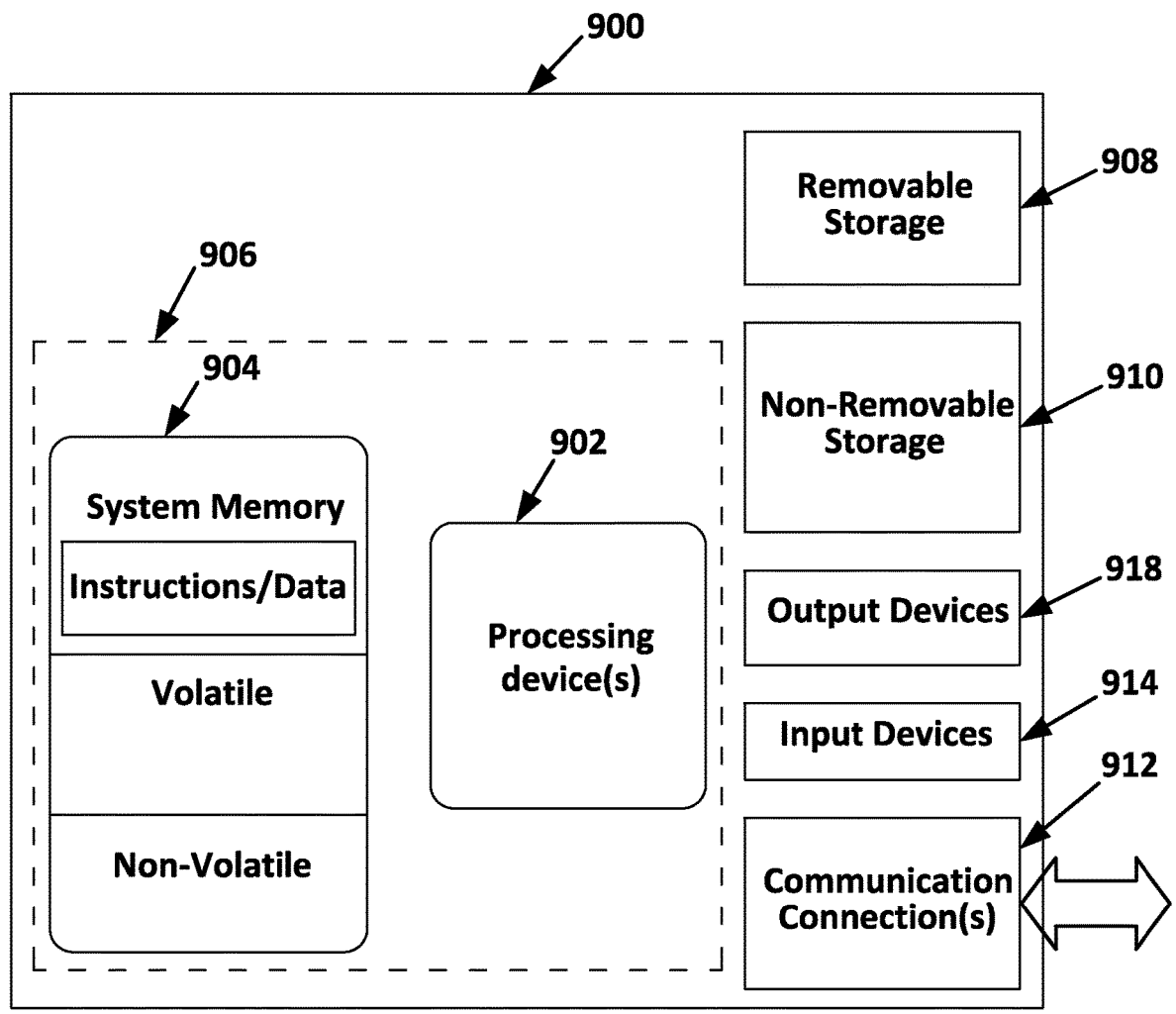
FIG. 9 illustrates one example of a suitable operating environment in which one or more of the present embodiments described herein may be implemented.

FIG. 9 illustrates one example of a suitable operating environment 900 in which one or more of the present embodiments may be implemented. For example, the operation environment is an example of any one or more of the protected devices 114, the router 110, the firewall device 104, the threat intelligence server 106, the reputation and relationship tracking server 108, and the sources of malicious network activity 92 (all shown in FIG. 1). This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, firewall devices, distributed computing environments that include any of the above systems or devices, and the like.

In its most basic configuration, operating environment 900 typically includes at least one processing device 902 and at least one computer readable media 904. Depending on the exact configuration and type of computing device, computer readable media 904 (storing, among other things, any one of the engines described herein, any of the data described herein, instructions to perform the methods disclosed herein, etc.) may be volatile (such as RAM), non-volatile (such as ROM, flash memory, etc.), or some combination of the two. This most basic configuration is illustrated in FIG. 9 by dashed line 906. Further, computer readable media may also or alternatively include other storage devices (removable, 908, and/or non-removable, 910) including, but not limited to, magnetic or optical disks or tape. Similarly, environment 900 may also have input device(s) 914 such as keyboard, mouse, pen, voice input, touch sensitive display, etc. and/or output device(s) 916 such as a display, speakers, printer, etc. Also included in the environment may be one or more communication connections, 912, such as LAN, WAN, point to point, etc.

Operating environment 900 typically includes at least some form of computer readable media. Computer readable media can be any available media that can be accessed by processing unit 902 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Some embodiments include non-transitory computer storage media. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 900 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of predicting network threats, the method comprising:
identifying a threat vector from network activity log data using one or more computing devices;
determining, based at least upon relationship data for the threat vector, a first online object having a first type and a second online object having a second type different from the first type, wherein the relationship data identifies a first association between the threat vector and the first online object and a second association between the threat vector and the second online object;
identifying the first online object as a predictive network threat based at least upon the first association between the threat vector and the first online object; and
providing data regarding the threat vector as an identified network threat and the first online object as the predictive network threat to a firewall device using the one or more computing devices, wherein the firewall device blocks network activity associated with the threat vector as the identified network threat and the first online object as the predictive network threat.

2. The method of claim 1, wherein the first type and the second type are one of: an internet protocol address, a file, a uniform resource locator, and a software application.

3. The method of claim 1, wherein identifying the threat vector from the network activity log data comprises:
receiving network activity log event data including at least one network event;
sending a request to a reputation management system; and
receiving a response from the reputation management system indicating whether the network event is a threat.

4. The method of claim 3, wherein the response from the reputation management system contains the results of an investigation conducted by the reputation management system to evaluate whether the network event is a threat.

5. The method of claim 1, wherein determining the first online object comprises:
sending a request to a relationship management system, the request identifying the threat vector; and
receiving a response from the relationship management system identifying the first online object.

6. The method of claim 5, further comprising determining a third online object having a third type, wherein the relationship data identifies a third association between the first online object and the third online object.

7. The method of claim 6, wherein determining the third online object comprises:
sending a subsequent request to the relationship management system, the subsequent request identifying the first online object; and
receiving a response from the relationship management system identifying the third online object.

8. The method of claim 6, wherein the third online object has no more than three degrees of separation from the threat vector.

9. The method of claim 1, further comprising adding the threat vector and the first online object to a block list of the firewall device, and operating the firewall device to block network traffic associated with the block list.

10. A computing system comprising:
at least one processing device; and
at least one computer readable storage device storing data instructions that, when executed by the at least one processing device, cause the at least one processing device to:
identify an online element associated with network activity;
determine that the online element is associated with a malicious reputation as an identified threat;
determine, based at least upon relationship data for the online element, a first online object having a first type and a second online object having a second type different from the first type, wherein the relationship data identifies a first association between a threat vector and the first online object and a second association between a threat vector and the second online object;
identify the first online object as a predictive threat based at least upon the first association between the online element and the first online object; and
sending data describing the online element as an identified threat and the first online object as the predictive threat to a firewall so that the firewall can block network activity associated with the online element and the first online object.

11. The computing system of claim 10, wherein the first type and the second type are one of: an internet protocol address, a file, a uniform resource locator, and a software application.

12. The computing system of claim 10, wherein determining that the online element is associated with the malicious reputation comprises:
receiving the network activity including at least one network event;
sending a request to a reputation management system; and
receiving a response from the reputation management system indicating whether the network event is a threat.

13. The computing system of claim 12, wherein the response from the reputation management system contains the results of an investigation conducted by the reputation management system to evaluate whether the network event is a threat.

14. The computing system of claim 10, wherein determining the first online object comprises:
sending a request to a relationship management system, the request identifying the online element; and
receiving a response from the relationship management system identifying the first online object.

15. The computing system of claim 10, wherein the computer readable storage device storing data instructions that, when executed by the at least one processing device, cause the at least one processing device to:
determine a third online object having a third type, wherein the relationship data identifies a third association between the first online object and the third online object.

16. The computing system of claim 15, wherein determining the third online object comprises:
sending a subsequent request to the relationship management system, the subsequent request identifying the third online object; and
receiving a response from the relationship management system identifying the third online object.

17. The computing system of claim 15, wherein the third online object has no more than three degrees of separation from the online element.

18. A method of predicting network threats, the method comprising:
receiving at a computing device a request including an identifier associated with an online element;
determining that the online element has a malicious reputation based on a comparison between the identifier associated with the online element and data in a reputation database;
sending by the computing device a response indicating that the online element has the malicious reputation as an identified network threat;
receiving at the computing device a request for known relationships to the online element;
searching a relationship database to identify a first online object and a second online object that also have the malicious reputation, using the computing device, the first online object having a first type and the second online object having a second type different from the first type, wherein there is a first association between the first online object and the online element and a second association between a second online object and the online element; and
sending from the computing device one or more identifiers for the first online object and the second online object as predictive network threats.

19. The method of claim 18, wherein the first association and the second association are each no more than three degrees of separation from the online element.

20. A method of predicting network threats, the method comprising:
identifying a predictive threat based on network activity data, the predictive threat comprising an element;
identifying other predictive threats related to the predictive threat by determining a first relationship between the element and a first online object and a second relationship between the element and a second online object, the first online object having a first type and the second online object having a second type different from the first type; and providing an update to a block list to a firewall device, wherein the update is configured to cause-the firewall device to add the predictive threat and the other predictive threats to the block list to protect a protected network from the predicted threat and the other predicted threats.

\* \* \* \* \*